Nov. 18, 1958  M. MACCAFERRI  2,860,375
MELT EXTRACTOR TYPE HEATING CYLINDERS
Filed June 13, 1956  3 Sheets-Sheet 1
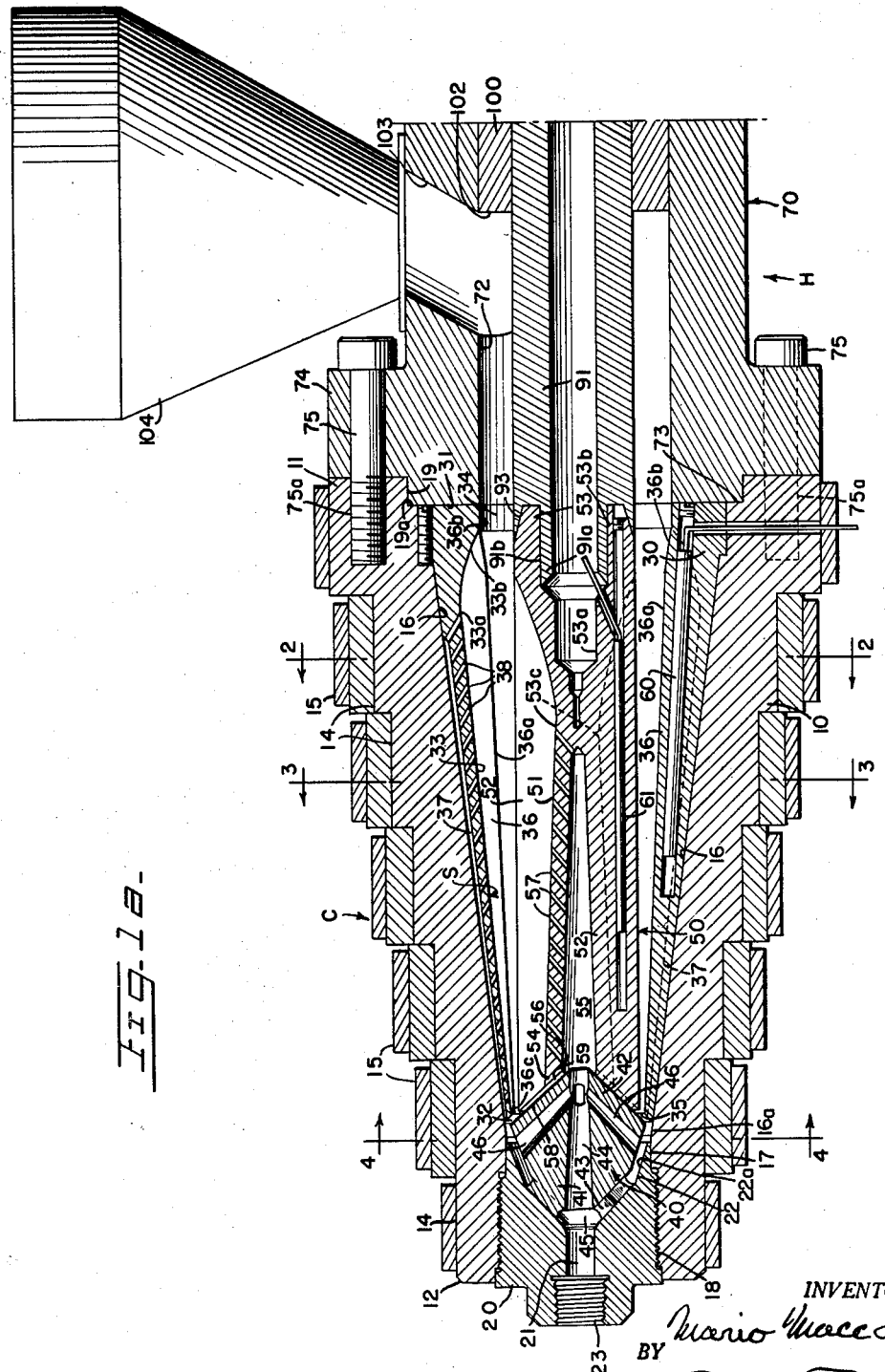
INVENTOR:
Mario Maccaferri
BY
Peck & Peck
ATTORNEYS

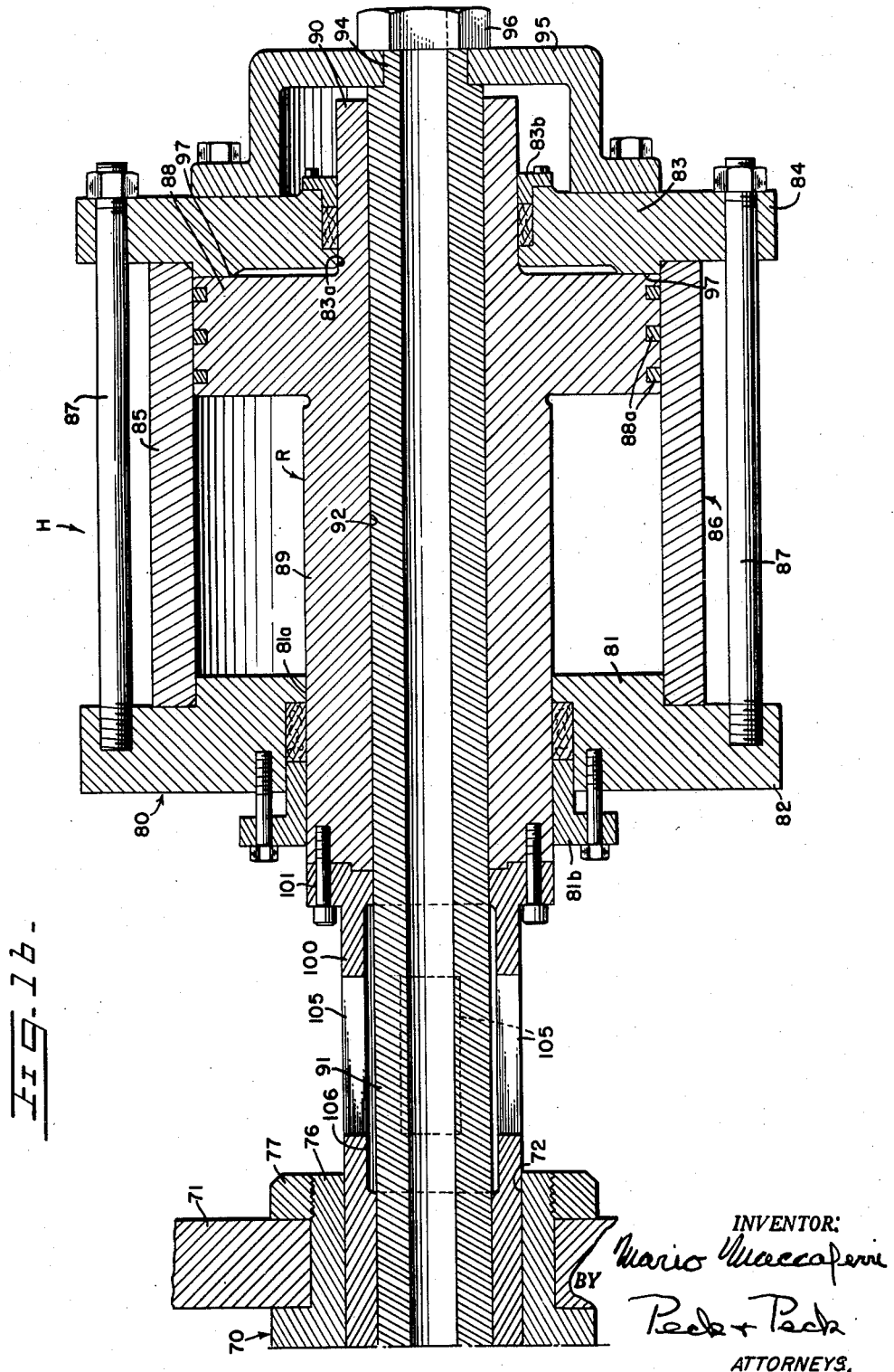

United States Patent Office 2,860,375
Patented Nov. 18, 1958

2,860,375

MELT EXTRACTOR TYPE HEATING CYLINDERS

Mario Maccaferri, Rye, N. Y.

Application June 13, 1956, Serial No. 591,057

15 Claims. (Cl. 18—30)

The invention relates to heating cylinders of the so-called melt extractor type for plasticizing plastic materials for molding or shape forming; and the nature and objects of the invention will be readily recognized and understood by those skilled in the art in the light of the following explanation and detailed description of the accompanying drawings illustrating what I now believe to be a preferred form and mechanical and thermodynamic expressions of my invention from among various other forms, designs, constructions and combinations of which the invention is capable within the broad spirit and scope thereof as defined in the claims hereto appended.

My present invention is directed to heating cylinders of the melt extractor types embodying the principles and the functioning as disclosed and claimed in my pending U. S. patent applications Serial No. 390,879 filed November 9, 1953, and Serial No. 489,080 filed February 18, 1955. Such types of heating cylinders function to plasticize solid and usually granular plastic material by applying heat by direct conduction along and around the peripheral surface of a substantially solid column of such plastic and extracting or bleeding-off the thin layer of plastic melt formed around such column and conducting the extracted melt under pressure to the injection discharge from the heating cylinder. Such a melt extractor heating cylinder in the forms thereof shown in my above-referred to pending patent applications is structurally characterized by a perforated melt extractor sleeve component of heat conducting material mounted in an axial bore or passage through a body or shell of heat conducting material with channels formed along and around the exterior of the sleeve between the sleeve and its mounting and enclosing shell for conducting the melt extracted from around the exterior surface of the column of plastic maintained in the sleeve and discharged thereinto through the sleeve perforations, to the injection discharge from the cylinder.

A primary object of my present invention is to increase substantially the quantity of the charge that can be plasticized and extracted by such a heating cylinder without appreciably increasing the length of the column of plastic fed to and maintained in the cylinder or appreciably increasing the length of the heating cylinder itself.

In carrying out the foregoing object a heating cylinder of my present invention is characterized by the fact that not only is plastic melt extracted from along and around the exterior surface of the column of plastic within the cylinder, but melt is also formed and extracted along and around the inner surface of a central passage formed axially through the column of plastic. The plastic column is formed in the heating cylinder as a tubular column by a melt extractor core member which extends axially through the column of plastic and which is provided with extractor ducts therethrough for bleeding-off the thin layer of plastic melt formed around the inner surface of the axial passage through the column.

A further object is to provide a heating cylinder for extracting plastic melt by the principles of the inventions of my above-identified pending patent applications from not only along and around the exterior surface of a column of plastic, but also and simultaneously from along and around an inner surface thereof formed by an axial passage through the column, so as to thereby substantially increase the quantity of the charge of plastic melt delivered by the heating cylinder for injection discharge therefrom.

Another object is to provide a mechanically and functionally efficient construction, mounting and assembly for the cylinder body or shell, the outer melt extractor sleeve component and the inner melt extractor core component making up a heating cylinder of my present invention.

A further object of my invention is to provide an improved method of plasticizing plastic materials by extracting melt from around the exposed surfaces of a mass of plastic material formed by the direct application of heat to such exposed surfaces.

A further object is to provide an improved hydraulic unit for combination and assembly with a heating cylinder of my present invention by which a tubular injection plunger is provided for feeding solid granular plastic to the tubular column of plastic maintained in the heating cylinder and for injecting from the cylinder the charge of plastic melt extracted from said column within the cylinder.

With the foregoing and various other objects, features and results in view which will be readily recognized and understood by those skilled in the art from the following detailed description and explanation, my invention consists in certain novel features in design, construction, assembly, and functioning of apparatus thereof, and in certain novel steps in the method of the invention, all as will be more fully referred to and specified hereinafter.

Referring to the accompanying drawings in which similar reference characters refer to corresponding parts and elements throughout the several figures thereof:

Fig. 1a is a vertical longitudinal sectional view through a melt extractor heating cylinder and hydraulic injection unit of my invention in operative assembled relation, the forward portion only of the hydraulic injection unit being shown.

Fig. 1b is a vertical longitudinal section in continuation of Fig. 1a through the remainder of the hydraulic injection unit, showing particularly the injection plunger operating cylinder and piston.

Fig. 2 is a transverse sectional view taken as on the line 2—2 of Fig. 1a.

Fig. 3 is a transverse sectional view taken as on the line 3—3 of Fig. 1a.

Figure 2:
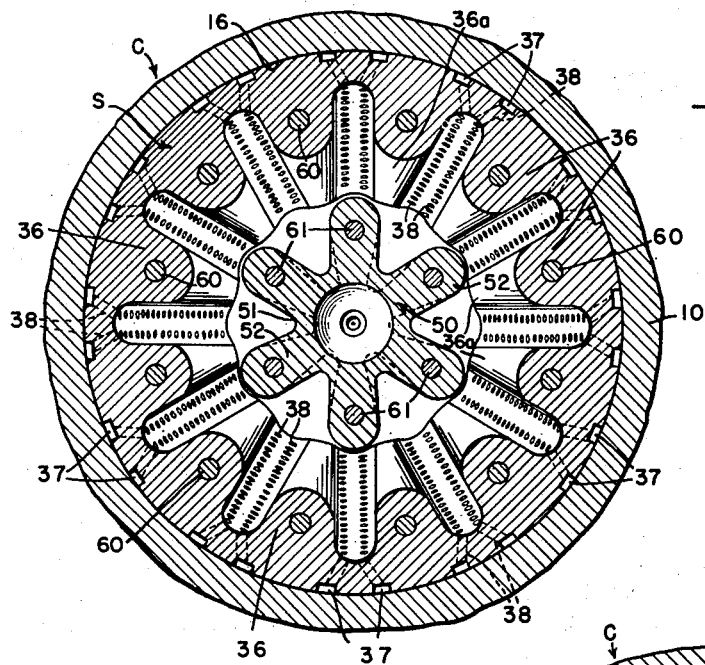

In the expression of my invention of the selected example form herein illustrated and described, the melt extractor type heating cylinder of the invention is identified generally by the reference character C and the hydraulic injection unit is identified generally by the reference character H, with the cylinder C and the injection unit H shown in operative combination to form the basic plasticizing and injection mechanism of a plastic injection molding machine. The heating cylinder C of this example of my invention carries out the extraction of melt from and along the outer and inner peripheral surfaces around a hollow or tubular column of plastic formed in the cylinder which is maintained therein by the feeding and replenishment of plastic thereto by the injection strokes of the hydraulic injection unit H as the charges of melt extracted from the plastic column are injected under pressure from the heating cylinder.

The heating cylinder C of this selected example of the invention includes the generally cylindrical body or shell 10 of heat conducting material having the large diameter intake end 11 and the reduced diameter injection discharge end 12. The shell 10 is formed with a series of steps 14 therearound of decreasing diameters therealong between the intake end 11 and the discharge end 12 of the shell. Suitable electrical heating bands 15 are mounted on and around the steps 14 in the usual manner familiar in this art for supplying heat by conduction to the heat conducting material body or shell 10 of the cylinder C. In this form of cylinder C the shell 10 provides a conical bore 16 which extends axially therethrough from and through the intake end 11 to a location spaced inwardly from the outer end of the injection discharge end 12 thereof. The conical bore 16 reduces in diameters inwardly from the intake end 11 of shell 10 to its reduced diameter end 16a spaced inwardly from the discharge end 11 of the shell. A straight bore 17 having an internally threaded counterbore 18 continues the conical bore 16 from the reduced diameter end 16a of the latter to and outwardly through the outer end of the injection discharge end 12 of the body or shell 10. The conical bore 16 terminates at its large diameter end in the counterbore 19 which forms an enlarged diameter circular recess in and opening through the intake end 11 of the shell 10. Such counterbore 19 thus forms an annular shoulder 19a around the enlarged diameter open end of the conical bore in the intake end 11 of body or shell 10.

An externally threaded nut or plug member 20 is threaded into and occupies the internally threaded counterbore 18 in the injection discharge end 12 of the body or shell 10. This plug member 20 is formed with an axial injection discharge bore 21 therethrough which discharges at its inner end into and is continued as a conical, radially outwardly flaring recess or chamber 22. The injection discharge bore 21 at its outer end is formed by an internally threaded counterbore 23 adapted to threadedly mount and receive therein any suitable injection nozzle (not shown), as will be readily understood by those familiar with the injection molding art. It will be further noted that the angle of inclination or taper of the conical recess 22 in the plug member 20 is decreased in and around the inner end thereof to provide the annular surface 22a therearound at an angle to the remainder of the surface of plug 20 which defines the conical recess 22.

In accordance with the principles of my melt extractor type heating cylinders, as disclosed in my aforesaid pending U. S. patent applications, Serial Nos. 390,879 and 489,080, the heating cylinder C is provided with a tapered and perforated extractor sleeve component of heat conducting material, such sleeve component being identified generally in the accompanying drawings by the reference character S. This melt extractor sleeve component S is in the form of a tapered hollow member having the same angle of taper on the exterior surface thereof as the angle of taper of the bore 16 in the body or shell 10. The sleeve member S is mounted in and extends through the tapered bore 16 of shell 10 with the surface of the sleeve member complementary to and tightly seated on and around and in direct heat transfer contact with the surface of the shell 10 which forms and defines the tapered bore 16. The sleeve member S has a length such that in mounted and assembled position in the shell 10 the large diameter end 30 thereof has its outer surface 31 substantially flush with the shoulder 19a formed at and around the large diameter end of bore 16 with its reduced diameter inner discharge end 32 located at but spaced a relatively short distance inwardly of the reduced diameter discharge end 16a of bore 16 of shell 10. The sleeve component S provides therethrough the conical bore 33 tapering from its large diameter intake opening 34 through the large diameter end 30 to its reduced diameter discharge end opening 35 through the inner reduced diameter end 32 thereof. In this specific example the conical bore 33 reduces in diameter from a location of maximum diameter at 33a to its intake opening 34 to provide the annular surface 33b therearound formed on a radius to progressively increase the diameter of the passage formed by the bore 33 from its intake opening to its maximum diameter at 33a, as will be clear by reference to Fig. 1.

The sleeve component S is provided with a plurality of ribs or flutes 36 extending longitudinally through the conical bore or passage 33 from the intake opening 34 to the reduced diameter discharge opening 35 at the inner end 32 of the sleeve component. In this form of the sleeve component S twelve (12) of these rib members 36 are provided spaced equal distances apart around the bore 33 with the ribs extending radially inwardly thereinto. The form and arrangement of the ribs or flutes 36 is clearly shown in Figs. 2 and 3 in connection with Fig. 1a. It is to be understood that the invention is not limited to any particular number of the ribs or flutes 36. The passage through the sleeve component S formed by the bore 33 is thus broken up by the ribs or flutes 36 into a series of longitudinal passages formed between the ribs and opening along their inner sides into the central portion of the bore 33. In this example the inner edges 36a of the ribs 36 extend from their origin at the intake opening 34 of the bore 33 at a relatively small angle of inclination inwardly to the discharge opening 35 at the inner end of the sleeve member, this angle of inclination in this instance being less than the angle of taper of the bore 33, as shown by Fig. 1a. It is also to be noted that the edges 36b of the ribs 36 at the intake end of the bore 33 are tapered or inclined radially outwardly at a relatively small angle. The inner discharge ends 36c of the ribs 36, due to the small angle of inclination longitudinally of the inner edges 36a thereof, have very small depths and, in effect, merge into the end edge 32a of the sleeve member at and surrounding the discharge opening 35 therefrom with this end edge 32a and the ends 36c of the ribs being tapered or inclined inwardly of the sleeve component toward the axis thereof.

Following the broad principles of my invention, as disclosed and explained in my above-identified pending U. S. patent applications, the sleeve component S is provided with a plurality of channels 37 in and disposed longitudinally along and spaced apart around the outer or exterior surface of the sleeve component. Thus, when the sleeve component is mounted in assembled position in the bore 16 of the body or shell 10, these channels 37 are tightly closed and sealed into separate and independent paths of flow by the shell 10. In this particular instance two (2) of these channels are provided along and opposite each passage formed between adjacent ribs or flutes 36, as will be clear by reference to Figs. 2 and 3. The channels 37 originate at a location around the sleeve component S spaced inwardly from the intake end 30 and the intake opening 34 therethrough of the sleeve component. This location of the origin of the channels 37 in this example is spaced a very slight distance inwardly from the location 33a on the passage formed and defined by the bore 33. These channels 37 extend from such location along the sleeve component S to the reduced diameter discharge end 32 thereof through which they open for discharge therefrom into the anular space provided between the discharge end 32 of the sleeve component and the inner end of the nut or plug member 20 in the counterbore 18. It will be further noted that in this instance the cross-sectional shape of each channel 37 is approximately rectangular and that each channel is substantially identical with each other channel both as to cross-sectional shape and as to dimensions. While the form and dimensions of the channels 37, as shown in this example, are believed to be preferable for the heating cylinder C, it is to be understood that variations in cross-sectional shape and in dimensions may be utilized to meet the conditions of various forms, dimensions and capacities of a heating cylinder of the invention.

The sleeve component S is provided with extractor ducts, passages or perforations 38 therethrough from the passages formed between the ribs 36 in the bore or passage 33 to the channels 37 for bleeding-off and extracting melt from the outer surface along and around a column of solid and usually granular plastic in the bore 33 of the sleeve member. In this instance two (2) rows or lines of these ducts 38 are provided between each passage between adjacent ribs 36 and the pair of channels 37 opposite and associated with such latter passage. The two (2) rows of the ducts 38 are in each instance parallel and spaced apart along the passage between adjacent ribs, with the ducts forming the rows diverging outwardly from such passage to and opening into and along the pair of channels 37 associated with that passage. The ducts or perforations 38 in each row thereof are relatively closely spaced apart along the length of the channels and are formed through the sleeve component S at an inclination outwardly from each passage between adjacent ribs 36 and the respective channels 37 into which they discharge in the direction of flow or displacement of the plastic charge in the passage defined by the bore 33 through the sleeve component. Thus plastic melt is extracted from and around the exterior of a column of plastic in the bore 33 through the ducts 38 into the channels 37 for flow through the latter to and discharge therefrom at the discharge end of the sleeve component S into the space within the bore 16 between such discharge end and the inner end of the nut or plug member 20. The arrangement and positioning of the ducts 38 through the sleeve component S will be clear by reference to Figs. 2 and 3 in connection with Fig. 1a of the drawings.

A retainer or distributor plug 40 of general double cone shape is mounted and assembled in the cylinder or shell 10 between the discharge end 35 of the melt extractor sleeve component S and the nut or plug member 20 in the counterbore 18 of the discharge end 12 of shell 10. This retainer plug 40 provides a forwardly extending conical portion 41 and an oppositely and inwardly or rearwardly extending conical portion 42 axially aligned with conical portion 41. The conical forward portion 41 of retainer plug 40 is positioned in the conical bore or recess 22 in the nut member 20 in position maintained spaced therefrom and therearound by the mounting pedestals 43 which may be either carried on the conical portion 41 or by the plug member 20. These pedestals 43 are spaced apart around the forward conical portion 41 of the retainer plug 40 so that suitable flow passages are formed between and around the retainer plug 40 and the injection nozzle mounting plug member 20. The conical portion 42 of the retainer plug 40 extends axially into the discharge end of the passage formed by the bore 33 of sleeve component S through the open discharge 35 from the sleeve component. The rear conical portion 42 of the retainer plug 40 is suitably spaced from the beveled discharge end of the sleeve member S, in a manner to be explained hereinafter. The retainer plug 40 has an axial passage 44 therethrough which opens at its inner end through the apex or end of the rear conical portion 42 located in bore 33 of sleeve component S. The passage 44 opens at its forward discharge end through the apex end of the forward conical portion 41 of the retainer plug 40. This passage 44 is in axial alignment with the injection discharge passage 21 through the nut member 20 and the passage is of tapered form increasing in diameters from its rear intake end to its forward discharge end. Preferably the forward or apex end of the forward cone portion 41 of retainer plug 40 is recessed at 45 to form a chamber between and placing passage 44 in discharge communication with the injection discharge passage 21 through the nut member 20.

Figure 4:
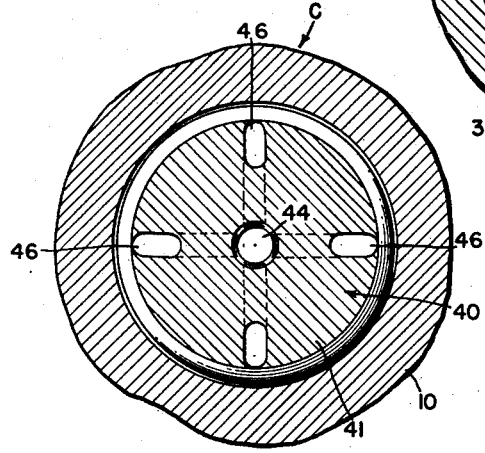
Fig. 4 is a transverse sectional view through the heating cylinder of Fig. 1a taken as on the line 4—4 through the retainer plug or member at the injection discharge end of the heating cylinder.

In addition to the axial passage 44 therethrough, the retainer or distributor plug 40 is provided with a plurality of branch passages 46 which are radially disposed around and which extend from the axial passage 44. In this instance, referring now to Fig. 4 in connection with Fig. 1a, four (4) of these passages 46 are provided spaced equal distances apart around the retainer plug 40 with their inner, intake ends opening into and in communication with passage 44 adjacent the inner intake end of the latter passage. The branch passages 46 are inclined forwardly and outwardly from and around the passage 44 through the rear cone portion 42 of retainer plug 40, to and open into the space formed around and between the forward cone portion 41 of retainer plug 40 and the tapered wall or surface defining the conical recess 22 in the nut or plug member 20 mounted at the discharge end 12 of the cylinder body or shell 10. In this particular example each of these branch passages 46 is of progressively increasing internal diameter or cross-sectional area from its intake at the axial passage 44 to its discharge through the outer side of retainer plug 40 into the space formed around and between the forward cone portion 42 of retainer plug and the recess 22 in the nut member 20.

With the body or shell 10 and the extractor sleeve component S of the heating cylinder C, as so far described, a mass or column of plastic in the passage formed by the bore 33 through the sleeve component will have plastic melt extracted from around and along the exterior surface thereof under the pressures exerted thereon in operation of the heating cylinder into the channels 37 through the ducts 38. However, by my present invention I form the mass or body of solid and usually granular plastic charge into and filling the passage within the sleeve component S formed by the bore 33, into a hollow column with provision for not only extracting melt from around the exterior of the column of plastic, but also for simultaneously extracting melt from the inner surface along and around the axial bore provided through such hollow tubular column of plastic. I form a mass of plastic charged into the extractor sleeve component S into a hollow column by providing a melt extractor core component 50 in and extending axially through the bore 33 of the sleeve component S so that this bore 33 is formed into a tubular passage around and between the core component 50 and the body of the sleeve component S. This core component 50 is suitably perforated and formed and provided with an axial passage therein and therethrough by which plastic melt is bled-off and extracted from the inner surface of the hollow or tubular column of plastic and is fed and delivered to the retainer plug 40 and the passages therethrough and therearound for mixing with the plastic melt delivered to the flow passages or spaces around retainer plug 40 by the channels 37 in and around the exterior surface of the extractor sleeve component S, to form the injection charge of plastic melt to be pressure discharged from the heating cylinder C.

In the heating cylinder C of the selected example of the invention, the core component 50 takes the form of a generally cylindrical body 51 having spaced apart therearound, disposed longitudinally therealong and extending radially outwardly therefrom a plurality of ribs or flutes 52. In this instance six (6) of said ribs or flutes 52 are provided spaced equal distances apart on and around the body 51 of the core component 50, with both the body 51 and the ribs 52 formed of heat conducting material. In this specific example the core component 50 has for location and mounting at the intake end of the heating cylinder C, a hollow mounting base portion 53 of enlarged external diameter relative to the body 51 of the component with this mounting base portion having an axial bore 53a therein which is continued by a socket forming counterbore 53b of enlarged internal diameter opening through the adjacent end of the body 51 and the core component. The bore 53a extends a short distance into the body 51 of the core component and is closed at its inner end by the body. The body 51 of the core component 50 tapers outwardly from a location at 53c adjacent the inner end of the enlarged diameter mounting base 53, that is, the body 51 progressively increases in external diameters from the location 53c to the opposite, discharge end 54 of the core component, as will be clear by reference to Fig. 1a. An axial flow passage 55 is formed in the core component body 51 from and opening through the discharge end 54 of that body to a location spaced inwardly a relatively small distance from the location 53c on such core body. This axial flow passage 55 is closed by the body 51 at the inner end of the passage and is of tapered form of progressively increasing internal diameters from its closed inner end to the discharge end 54 through which it opens as an enlarged diameter discharge 56.

The ribs or flutes 52 along and around the body 51 of the core component 50 provide plastic receiving passages therebetween and break up a mass of plastic in the main passage formed by the bore 33 in the extractor sleeve component S, with plastic of such mass filling these passages and in direct heat transfer relation with the ribs 52 and the body 51 at and along the inner sides of such passages between the ribs. The thin layer of plastic melt formed by the direct transfer of heat to the surfaces of the column of plastic in the passages between the ribs 52 is extracted from the column of plastic and bled-off therefrom into the passage 55 of the core component 50 by a plurality of melt extraction ducts or passages 57 formed through the body 51 from the inner sides of the passages between the ribs 52 to and discharging into the flow passage 55. In this instance a plurality of these melt extraction ducts 57 is provided along each passage between adjacent ribs 52 substantially throughout the length of the axial flow passage 55 with the ducts being in parallelism, relatively closely spaced apart and inclined inwardly from each passage between adjacent ribs to the flow passage 55 in the direction of flow of plastic melt through the latter passage. The arrangement and locations of these melt extractor ducts 57 in the core component 50 will be clear by reference to Figs. 1a, 2, and 3. In the specific example of heating cylinder of the invention hereof, it will be noted that the outer edges of the ribs or flutes 52 of the core component 50 are spaced inwardly from the inner edges of the ribs or flutes 36 of the extractor sleeve component S with the width of such spacing decreasing from the intake end to the discharge end of the sleeve component and the core component. Thus formed and arranged, there is provided an uninterrupted annular space around and throughout the length of passage 33 of sleeve component S.

The ribs 52 and the body 51 of the core component 50 at the discharge end thereof are beveled or inclined inwardly of the component to form the conical recess identified generally by the reference character 58 for receiving and seating therein the rear cone portion 42 of the retainer 40 with the extractor core member 50 in mounted and assembled position in the melt extractor component S of the heating cylinder C. Referring to Fig. 1a, the core component 50 is mounted in position in and extending axially through melt extractor sleeve component S with the rear cone portion 42 of the retainer plug 40 extending into the recess 58 at the discharge end of the core component so that the latter is fitted and centered over and on the retainer plug. Seating and positioning ribs 59 are provided between and spaced apart around the rear cone portion 41 in line with the inclined ends of the ribs 52 to space the discharge end of the core component from the cone portion 42 and thus provide flow passages in communication with the discharge from the melt extractor sleeve component S and core component 50. These seating and positioning ribs 59 may be either carried by the rear cone portion 42 of the retainer plug 40 or the inclined rear ends of the ribs 52. The melt extractor core component 50 in mounted and assembled position has the base portion 53 thereof at the intake end of the sleeve component S secured to suitable structure to maintain it in rigid fixed position with the forward or discharge end of the core component held rigidly against and on the seating ribs 59 between it and the core plug 40. Thus mounted and assembled, the core member 50 forms an annular or tubular passage therearound for receiving and forming a mass of solid and usually granular plastic fed thereinto into a hollow or tubular column of plastic from which melt is extracted by the sleeve component S and the core component 50 from along and around the exterior surface and from along and around the interior surface of the axial passage through such hollow or tubular column of plastic.

One of the features of the invention which is applicable to increase heating capacity and the plasticizing efficiency of both a melt extractor heating cylinder of the types of my above identified pending U. S. patent applications in which melt is extracted solely from the exterior surface of the mass or column of plastic in the cylinder, and of the type of heating cylinder of my present invention, resides in mounting heating elements in the form of cartridges in the rib members 36 of the sleeve component S and the rib members 52 of the core component 50.

Figure 3:
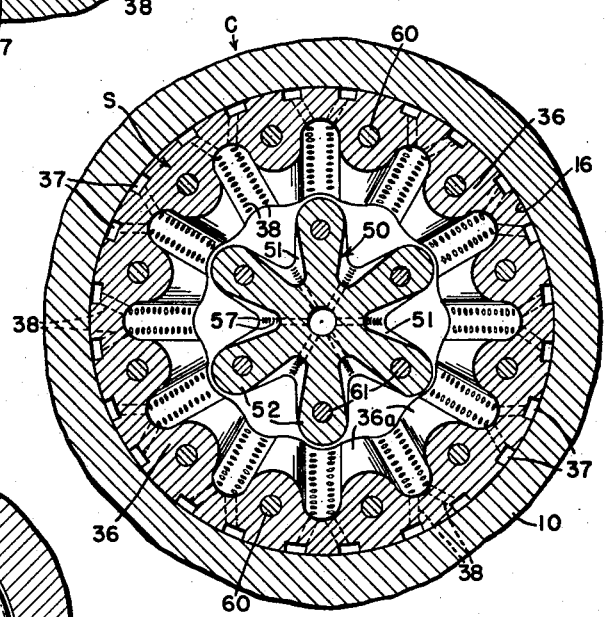

Referring to Figs. 1a, 2, and 3 of the drawings, a heating cartridge 60 is mounted in a bore extending inwardly a substantial distance into each rib 36 of the sleeve component S from the large diameter intake end 30 of the component. Thus, in the specific example twelve (12) of these heating cartridges 60 are mounted in and around the intake section of the passage defined by the bore 33 through the sleeve components. Thus added heat is supplied to the intake lengths of the ribs 36 of the heating cylinder from the intake end for a substantial distance along the plastic passage formed by the bore 33 through the cylinder C. The provision of such heating cartridges 60 increases the efficiency of the operation of a heating cylinder of the types of my above-identified patent applications as well as increasing the efficiency of what may be called the "double" extractor types of my present invention. Similar heating cartridges 61 are provided in the body 51 of the core component 50 extending from the mounting base of that component inwardly along the ribs 52 thereof for supplying additional heat to the ribs for direct transfer to the column of plastic in contact therewith along the intake length or section of the core component 50 and the inner surface around the tubular column of plastic formed in the extractor sleeve components.

While a heating cylinder embodying my present invention, such as the heating cylinder C of the example hereof, may be mounted in operative association with any suitable power actuated plastic feeding and plastic melt discharging mechanism, I have as a further part and feature of the invention herein presented, provided a plastic feeding and plastic melt injecting mechanism or unit H of the reciprocating injection plunger type for operative combination and association with the heating cylinder C.

Referring to Fig. 1a in connection with Fig. 1b, the injection mechanism or unit H for the example cylinder C is of the hydraulic type and includes an injection plunger body 70 which is mounted and supported by a suitable vertical plate or bolster 71 from the supporting bed or frame structure (not shown) of an injection molding machine organization. The injection plunger body 70 is formed and provided with a reciprocating plunger bore 72 therethrough. At the forward side or end the body 70 is formed with a reduced diameter forwardly extending circular base 73 thereon surrounded by the annular flange 74. The heating cylinder C is mounted and attached in rigid position on the forward side of body 70 with the base 73 of the body fitting into and seating in the circular recess in the intake end 11 of the cylinder C formed by the counterbore 19. The outer surface of the intake end of cylinder body or shoulder 10 seats on and around the shoulder provided by the flange 74 on the forward end of the body 70. Suitable threaded bolts or machine screws 75 extend through the annular flange 74 of the body 70 surrounding the base 73 and are threaded at their inner ends into tapped bores 75a formed in the body or shell 10. At the opposite or rear end thereof the body 70 is provided with a neck or reduced diameter extension 76 which extends through a suitable opening in the bolster plate 71. The outer end of the neck 76 is externally threaded and a securing nut 77 is threaded thereon. The nut 77 is drawn up tightly to thus firmly secure and mount the body 70 in rigid position on the bolster plate 71 with the cylinder C extending forwardly from the bolster plate. Thus mounted, the cylinder C has its main plastic passage formed and defined by the bore 33 in axial alignment with the plunger bore 72 through the plunger body 70. The bore 72 has an internal diameter the same as the internal diameter of the intake opening 34 through the intake end 11 of the extractor sleeve component S of the cylinder C. The plunger bore 72 through the body 70 is of constant internal diameter throughout the length thereof and extends through the neck 76 to and opens through the rear end thereof.

Spaced rearwardly a distance from the injection plunger body 70 a hydraulically operated cylinder and piston unit is mounted, such unit being identified generally by the reference character 80. This cylinder and piston unit 80 is suitably mounted and supported, preferably from the same supporting structure as provided for the injection piston body 70, which may be preferably the supporting bed or frame structure of an injection molding machine (not shown). The unit 80 includes a cylinder head plate 81 having a radially outwardly extending flange 82 therearound and a generally similar rear plate 83 having a radially outwardly extending flange 84 therearound. The head plate 81 and rear plate 83 are mounted in vertically disposed, parallel position spaced apart to receive therebetween the cylinder wall forming sleeve 85. This cylinder wall sleeve 85 has a constant internal diameter which is the same as the external diameters of the head plate 81 and the rear plate 83. The cylinder wall sleeve 85 is assembled in mounted position with its forward and rear ends fitted tightly over and in sealing engagement with the head plate 81 and the rear plate 83, respectively. The head plate 81, rear plate 83, and cylinder wall sleeve 85 are assembled together to form the hydraulic cylinder, identified generally by the reference character 86, by the tie bolts 87 which extend across and between and which are secured at their opposite ends in head plate 81 and rear plate 83, and thus clamp and fix the cylinder wall sleeve 85 between these plates and the flanges 82 and 84 thereof, as will be clear by reference to Fig. 1b of the drawings.

The head plate 81 and the rear plate 83 of the cylinder 86 are formed with axially aligned bores 81a and 83a therethrough, respectively, these bores being in axial alignment with the plunger bore 72 through the body 70. A hydraulic ram R is slidably and reciprocally mounted in the cylinder 86. This ram R includes the piston head 88 having slidable engagement with the inner surface of the cylinder wall sleeve 85 and being provided with the piston rings 88a to form the usual seal between the piston head and the cylinder wall sleeve. The ram R extends forwardly through and in slidable engagement with the bore 81a in the head plate 81, as the cylindrical section piston rod 89. The ram R also includes the rearwardly extended circular section rod member 90 which extends rearwardly and slidably through the bore 83a in the rear plate 83. In order to provide leak-proof reciprocating fits for the piston rod 89 in the head plate 81 and for the rearwardly extending rod member 90 in the rear plate 83, the usual or any desired packing glands 81b and 83b are provided in the head plate 81 and in the rear plate 83, respectively.

In this example of heating cylinder C and hydraulic injection unit H, the melt extractor core component or member 50 of the heating cylinder is mounted at its intake end on the forward end of a tube member 91 which extends rearwardly through the plunger body 70 and the hydraulic ram R and ties the core member 50 of the cylinder C and the hydraulic injection unit H together in rigid assembled relation. This tube member 91 in the example hereof is of constant external diameter throughout the major portion of its length and the ram R is provided with a bore 92 of the same internal diameter as the external diameter of the tube member 91. This bore 92 through the ram R extends completely axially through the latter including the rearwardly extending rod member 90 of the ram. Thus the ram R is slidably reciprocally mounted in the head plate 81 and rear plate 83, on and relative to tube member 91.

The forward end of tube member 91 is formed with a forwardly open annular recess 93 therein and therearound spaced a distance inwardly from the forward end 91a of the tube member. The end of the extractor core member 50 of heating cylinder C is received and fitted into this recess 93 with the forward end 91a of tube member 91 extending into the socket therefor formed in the end of the core member 50 by the bore 53b. The rearwardly extending rod member 90 of the ram R extends outwardly a distance beyond rear plate 83 and the gland 83a therein, and the tube member 91 extends a distance outwardly beyond the outer end of rod member 90 where it terminates in a reduced diameter end 94. A bridge member 95 is suitably bolted to the rear or outer side of the rear plate 83 and extends over and across the extended rear ends of rod member 90 of ram R and tube member 91 with the reduced diameter end 94 of the latter extending through this bridge member. The reduced diameter end 94 of the tube member 91 extends outwardly beyond bridge member 95 and is externally threaded. A nut 96 is threaded onto the outer end 94 of tube member 91 and is turned up tightly against the bridge member 95 to thus clamp the core member 50 of the heating cylinder C in rigid position secured between the retainer plug 40 at the discharge end of the heating cylinder C and the forward end of the tube member 91 in which the base or mounting end 53 of the core member 50 is seated.

A tubular injection plunger 100 is slidably mounted on and over the tube member 91 for reciprocation thereon by and with the ram R. The tubular plunger 100 is rigidly attached to the forward end of piston rod member 89 of the ram R by suitable machine screws or the like 101. The injection plunger 100 has a length such that with the ram R at the limit of its retraction stroke moved outwardly to position against an annular raised portion or shoulder 97 around the inner side of the rear plate 83, as shown in Fig. 1b, the forward end surface 102 is located at the rear side of a plastic feed passage 103 extending downwardly through the plunger body 70 from the upper side thereof and discharging into the plunger bore 72, as shown in Fig. 1a. Any suitable feed hopper 104 is mounted in position for gravity feed of solid, granular or other loose bulk form of plastic material therefrom to and downwardly through the feed passage 103 into the annular plunger bore 72 in the body 70. On the injection stroke of the ram R the injection plunger 100 attached thereto is forced forwardly through the annular passage formed in plunger bore 72 along and around the tube member 91 until the piston member 88 of ram R reaches the limit of its injection stroke as determined by its engagement against the inner side of the head plate 81. At the limit of the injection stroke the tubular injection plunger 100 will have the forward end 102 thereof at and substantially flush with the end surface of the forward end of the body 70 that is engaged by the end surface 31 of the extractor sleeve component S of the cylinder C.

It will be noted that not only does the melt extractor core component 50 of the heating cylinder C form the passage through the extractor sleeve component S into an annular passage but the tube member 91 of the hydraulic injection unit also forms the plunger bore 72 through the plunger body 70 and as this intake opening and such bore are in axial alignment and as the tube member 91 extends through this opening 34, it follows that opening 34 is formed by tube member 91 into an annular intake opening in precise forward continuation of the annular injection plunger receiving passage through the injection plunger body 70.

In this example the tubular injection plunger 100 is provided with a plurality of slots 105 therethrough disposed longitudinally therealong and spaced equal distances apart therearound. The tubular plunger 100 is formed of increased internal diameter at and around the length or section thereof through which the slots 105 extend to form an annular space 106 around the tube member 91 with the slots 105 opening into such annular space 106. The length of the annular space 106 is greater than the length of the slots with the space 106 extending a distance along the plunger beyond the opposite ends of the slots. In this particular example four (4) of the slots 105 are provided spaced apart 45° around the plunger. The purpose of the slots 105 through and of the annular space 106 around the interior of the tubular plunger 100 is for the collection and discharge thereof through slots 105 to atmosphere, of any fine, granular flake material to prevent such material being carried along and between the tube 91 and the plunger 100 into the hydraulic ram R. Further, these slots 105 permit visual determination of the amount of plastic flaking which is taking place during normal injection operations.

The cylinder 86 is provided with the usual pressure fluid intake and outlet ports at opposite ends thereof and at opposite sides of the piston member 88 for admitting fluid under pressure alternately to opposite sides of the piston member and alternately exhausting fluid therefrom in the usual manner well-known and familiar in the art for two-way pressure fluid operation of a reciprocating piston or ram. In the normal operation of the injection mechanism formed by the assembled, unitary combination of the heating cylinder C and the hydraulic injection unit H, when the ram R and its injection plunger 100 are in retracted position as shown in Figs. 1a and 1b, a charge of solid granular plastic has been fed by gravity from the hopper 104 through the feed passage 103 into the annular plunger passage 72 between the heating cylinder intake 34 and the plunger 100 preparatory to the injection stroke of the injection plunger 100 by the ram R. When the injection stroke is to be made, fluid under pressure is admitted to the cylinder 86 at the outer side of piston member 88 to thus force ram R with its plunger 100 forwardly on the injection stroke. The forward end of the plunger 100 engages and forces the charge of plastic fed to the plunger passage 72 forwardly therethrough and through the annular intake opening 34 of the heating cylinder C, into and against the column of plastic formed in the heating cylinder between and around the core member 50 and the sleeve component S. The pressure delivered by the injection plunger 100 is applied to and throughout the column of plastic in the heating cylinder C and forces extraction of the plastic melt from the relatively thin layer thereof formed and forming around the outer and inner sides of the column through the extractor sleeve component S and the core member 50. The plastic melt so extracted is then forced under the pressures exerted thereon by the injection plunger through the channels 37 around the sleeve component S and through the axial passage 55 in the core member 50 to and through and past the retainer block 40 to the discharge passage 21 to form the charge of plastic melt to be injected into a mold or other shape-forming unit. On the completion of the injection stroke the injection plunger 100 is then withdrawn by pressure fluid actuation of the ram R to retracted position preparatory to the next injection stroke thereof. It will be noted that on the injection stroke the plunger 100 closes off the plastic feed passage 103 but opens such feed passage when it reaches the limit of its retraction stroke for gravity feed into the plunger bore 72 of the next charge of plastic for charging into the cylinder C by the next injection stroke of the plunger.

By my present invention I have provided a method of plasticizing which essentially includes the steps of forming and maintaining a tubular or hollow column of solid granular or bulk plastic material and simultaneously applying heat directly to and along the outer and inner surface areas of such tubular column and extracting under pressure the relatively thin layers of plastic melt formed in and around and along such inner and outer surfaces with the plastic melt so extracted being forced under pressure to and through a discharge point. Thus a substantially increased quantity of the solid plastic of the column may be plasticized in a given period of time, while a more uniform character of melt charge with more uniform temperatures throughout the charge results. With a melt extractor type of heating or plasticizing cylinder of my present invention for carrying out such method, as exemplified by the selected heating cylinder C hereof, a greatly increased plasticizing capacity is obtained without any appreciable increase in the length of the heating cylinder or the length of the tubular column of plastic material formed and maintained therein. The provision of the ribbed melt extractor sleeve component and the ribbed melt extractor core component of the example cylinder C of the invention greatly increases the effective heating surface area in direct heat conducting relation with the inner and outer surface areas of the plastic column. However, due to the design and construction of these components and the ribs and flutes thereon, with the resulting annular plastic column forming passage therebetween such increased plasticizing capacity is obtained with minimum resistance to movement of the solid granular plastic through the heating cylinder and minimum pressure loss at the injection discharge end of the cylinder. Notwithstanding the greatly increased capacity and efficiency of a heating cylinder of the invention, the structural and mechanical expression thereof is, as shown by the example cylinder C hereof, capable of being readily practically manufactured at reasonable costs.

While I have shown a heating cylinder C embodying my invention as combined with a hydraulic injection unit of the reciprocating plunger type, it is to be understood that a cylinder of my invention is adapted to continuous cycle operation and may be used as a plasticizing component with a continuous plastic feeding unit for continuously feeding plastic to the cylinder and discharging plastic melt therefrom. Such continuous cycle operation of a heating cylinder of my invention may, for example, be used for continuous extrusion of plastic materials.

It will also be evident that various changes, modifications, variations, substitutions, eliminations and additions may be resorted to both as to apparatus and method, without departing from the broad spirit and scope of my invention; hence I do not desire or intend to limit my invention either as to apparatus or method in all respects to the exact and specific example embodiments or expressions of the invention as herein disclosed and described, except as may be required by intended specific limitation thereto appearing in any of the claims hereto appended.

What I claim is:

1. A heating cylinder of the melt extractor type including, in combination, a cylinder body of heat conducting material having a plastic intake opening through one end thereof, a melted plastic discharge opening through the opposite end thereof, and an axial bore therethrough from said intake opening to said discharge opening; a melt extractor sleeve member of heat conducting material having an axial bore therethrough mounted in and extending through said bore in said cylinder body in direct heat transfer contact therewith; a melt extractor core member of heat conducting material mounted in and extending axially through said bore in said melt extractor sleeve member; said core member forming said axial bore through said sleeve member into an annular passage therethrough along and between said core member and said sleeve member; said core member having an axial passage therein and being also provided with ducts therethrough along said passage from and around the inner side of said annular passage within said sleeve member to and discharging into said axial passage of said core member; said cylinder body and said sleeve member formed to provide plastic melt receiving channels longitudinally therealong and therebetween spaced from and spaced apart around said sleeve member; said sleeve member having ducts therethrough from and along the outer side of said annular passage therewithin to said channels; and said cylinder having plastic melt flow passages from said axial passage within said core member and from said channels around said sleeve member to said discharge opening from said cylinder body.

2. A heating cylinder including, in combination, a cylinder body of heat conducting material having an axial bore therethrough with an intake for plastic material through one end of said cylinder body; said cylinder body having a discharge opening therethrough for discharging plastic melt therefrom; said cylinder body being formed to provide flow channels therein separate from, spaced apart around and extending longitudinally along said bore; said cylinder body having melt extraction ducts from and around the outer side of said bore and discharging into said channels; a melt extractor core member of heat conducting material mounted in and extending axially through said bore in said cylinder body forming said bore into an annular passage therethrough along and around said core member; said core member having an axial passage therewithin and plastic melt extraction ducts therethrough from and along the outer side thereof to said axial passage therewithin; and said cylinder body having therein plastic flow passages from said channels around the outer side of said annular passage and from said axial passage within said core member to said discharge opening from said cylinder body.

3. A heating cylinder of the melt extractor type including, in combination, a cylinder body of heat conducting material having an annular intake opening for charging plastic material therethrough, a melted plastic discharge opening for discharging plastic melt therefrom, and an axial bore therethrough from and in plastic receiving communication with said annular intake opening; said cylinder body having plastic melt receiving channels therein spaced from and spaced apart around said axial bore therethrough with plastic melt extraction ducts therein from and along said axial passage to said channels; a melt extractor core member of heat conducting material mounted in and extending axially through said bore in said cylinder body forming said passage into an annular bore for receiving and maintaining therein a tubular column of plastic material to be melted; said core member having an axial passage therein for receiving plastic melt from along and around the inner surface of a column of plastic in said annular passage; said core member having plastic melt extraction ducts therethrough from the inner surface of said annular passage to said axial passage in said core member; and said cylinder having therein passages from said channels around the outer side of said annular passage and from said axial passage in said core member to said discharge opening from said cylinder.

4. A heating cylinder including, in combination, a body of heat conducting material having an intake opening for plastic to be melted, a melted plastic discharge opening therefrom, and an axial passage therethrough from said intake opening to said discharge opening; said cylinder body having separate flow channels therein spaced from and spaced apart around said axial passge disposed longitudinally therealong; said cylinder body being also provided with a plurality of ducts therethrough spaced apart therealong and therearound from said axial passage to said flow channels; said flow channels extending along and around said axial passage to locations spaced a distance inwardly from said melted plastic discharge opening of said cylinder body and having discharge openings therefrom at such locations; a melt extractor core member of heat conducting material mounted in and extending axially through said axial passage in said cylinder body forming said latter passage into an annular passage therethrough from said intake opening of said cylinder body to a location adjacent said discharge ends of said channels in said cylinder body; said core member having an axial passage therein and being also provided with ducts therethrough from said annular passage around said core member to said axial passage therein; said core member being provided with a discharge opening from said axial passage therein at a location adjacent said discharge openings from said channels; a retainer member mounted in said cylinder body between the discharge ends of said channels and the discharge opening from said core member and said melted plastic discharge opening from said cylinder body; and said retainer member providing passages therethrough and therepast placing the discharge ends of said channels and the discharge end of said passage in said core member in communication with said melted plastic discharge opening from said cylinder body.

5. A heating cylinder, including a cylinder body of heat conducting material having an intake opening for plastic to be melted therein, a discharge opening for discharging plastic melt therefrom, and a passage extending therethrough from said intake opening for receiving and maintaining therein a mass of plastic to be melted; said cylinder having channels therein spaced outwardly from and spaced apart around said passage disposed longitudinally thereof and ducts spaced apart along said channels from said passage; said cylinder also having heat conducting material ribs extending radially into, spaced apart around and disposed longitudinally along said passage; a core member mounted in said passage disposed axially thereof forming said passage into an annular passage around and between said core member and said cylinder body; said core member having ribs of heat conducting material extending radially outwardly therefrom, spaced apart therearound and disposed longitudinally therealong; said ribs of said core member having the inner edges thereof spaced from the inner edges of said radially inwardly extending ribs of said cylinder body; said core member having an axial passage therein and ducts therethrough from said annular passage therearound to said axial passage therewithin; and said cylinder body having passages therein from said channels in said cylinder body and said axial passage in said core member to said discharge opening of said cylinder body.

6. In the combination defined in claim 5, heating members mounted in said ribs of said cylinder body and heating members mounted in said core member.

7. In the combination as defined by claim 5, heating members mounted in each of said ribs of said cylinder body in locations extending from the ends of said ribs at the intake end of said cylinder body a distance thereinto along the intake section of said annular passage, and heating members mounted in said core member at spaced locations therearound, said latter heating members extending along the inner end section of said axial passage in said core member.

8. In a heating cylinder, in combination, a cylinder body of heat conducting material having an inlet opening in one end thereof, a discharge opening in the opposite end thereof, and a passage therethrough from said inlet opening to said discharge opening; a retainer member mounted in said passage in said cylinder body at the discharge opening end thereof; said retainer member being formed to provide flow passages therepast from said passage to said discharge opening of said cylinder body; a melt extractor sleeve member of heat conducting material mounted in said passage in said cylinder body in direct heat conducting contact therewith and extending therethrough from said intake opening to said retainer member; said melt extractor sleeve member having radial perforations therethrough spaced therearound and therealong; said sleeve member having an inlet opening through the end thereof at said inlet opening in said cylinder body and a discharge opening therefrom at the end thereof at said retainer member, and a passage therethrough from said intake opening to said discharge opening; said heating cylinder having channels therein along the exterior side of said sleeve member with said perforations opening thereinto and said channels discharging at their inner ends at said retainer member; a melt extractor core component mounted in and extending axially through said passage within said melt extractor sleeve member forming said latter passage into an annular passage and forming said intake opening into an annular opening; said core member having an axial passage therein opening through the end thereof at said retainer member; said retainer member having flow passages therethrough from said discharge from said axial passage in said core member to said discharge opening of said cylinder body; and said core member also having a plurality of ducts therethrough spaced apart therearound and spaced apart therealong from said annular passage around said core member to said axial passage therewithin.

9. A heating cylinder of the melt extractor type having, in combination, an intake opening for charging thereinto unplasticized plastic to be melted, a discharge opening for discharging plastic melt therefrom, and an annular passage extending therethrough from said intake opening for receiving and maintaining therein a tubular column of unplasticized plastic to be melted; means for applying heat along and around the inner surface of a tubular column of unplasticized plastic in said annular passage; means for applying heat along and around the outer surface of the column of plastic in said annular passage; means for extracting plastic melt from along and around the inner surface of a column of plastic in said annular passage; means for extracting plastic melt from along and around the outer surface of a column of plastic in said annular passage; and means for conducting the plastic melt so extracted from said inner surface and from said outer surface of the column of plastic in said annular passage to said discharge opening from said cylinder.

10. In a heating cylinder, in combination, a cylinder body of heat conducting material having an axial bore therethrough; a melt extractor sleeve member of heat conducting material having an axial bore therethrough; said melt extractor sleeve member being fitted within and extending through said bore in said cylinder with adjacent surfaces of said melt extractor sleeve member and said cylinder body in direct heat conducting contact; a melt extractor core member of heat conducting material mounted in and extending axially through said melt extractor sleeve member forming said bore within the latter member into an annular passage around and between said melt extractor core member and said melt extractor sleeve member for receiving therein a tubular column of unplasticized plastic; said melt extractor sleeve member being formed for extraction of plastic melt therefrom outwardly therethrough along and around the outer surface of a column of plastic in said annular passage; said melt extractor core member having an axial passage therein and being formed for extraction of plastic melt inwardly into said axial passage from along and around the inner surface of a column of plastic in said annular passage; said cylinder body having an intake opening therethrough into said annular passage in said melt extractor sleeve member; said cylinder body having a discharge outlet therefrom for plastic melt; and said cylinder being formed to provide flow passages therein for conducting plastic melt extracted by said melt extractor sleeve member and said melt extractor core member to said discharge outlet from said cylinder body.

11. In a method of plasticizing, the steps of: forming and maintaining a tubular column of unplasticized plastic to be melted; applying plasticizing heat along and around the inner and outer surfaces of the tubular column of plastic to form relatively thin layers of plastic melt along and around such surfaces; extracting the plastic melt so formed from and along said inner and outer surfaces of said tubular column of plastic; and collecting the extracted plastic melt.

12. In a method of plasticizing, the steps of: forming and maintaining a wall of unplasticized plastic to be melted; applying plasticizing heat to and over opposite side surfaces of said wall of plastic to form relatively thin layers of plastic melt over said opposite side surfaces; extracting the plastic melt so formed from said opposite sides of said wall plastic; and collecting the extracted plastic melt.

13. In a method of plasticizing, the steps of: forming and maintaining a tubular column of unplasticized plastic to be melted; simultaneously applying plasticizing heat along and around the outer and inner surfaces of the tubular column of plastic to form relatively thin layers of plastic melt along and around said outer and inner surfaces; and while applying plasticizing heat to said inner and outer surfaces extracting the plastic melt from and along said inner and outer surfaces of said tubular column of plastic.

14. In a method of plasticizing, the steps of: forming and maintaining a tubular column of unplasticized plastic; applying heat simultaneously along and around the inner surface and the outer surface of said column of unplasiticized plastic to form layers of plastic melt along and around said inner surface and said outer surface; during the application of heat to said inner surface and said outer surface extracting from said surfaces the layers of plastic melt formed thereon and therearound; and collecting and forming charges of said plastic melt so extracted from said inner and outer surfaces of said column of unplasticized plastic.

15. In a method of plasticizing, the steps of: forming a tubular column of unplasticized plastic material; maintaining said column of unplasticized plastic material against axial displacement bodily as a mass while applying pressure to one end thereof acting in directions axially and radially along the column; applying heat along and around the inner surface of said column of unplasticized plastic to form a layer of plastic melt along and around said inner surface; applying heat along and around the outer surface of said column of unplasticized plastic to form a layer of plastic melt along and around said outer surface; extracting said layers of plastic melt from along and around said inner and said outer surfaces of said column of unplasticized plastic material by the axial and radially acting pressures applied to an end of said column; and replenishing the plastic melt extracted from along and around said inner and outer surfaces of said column of plastic by adding unplasticized plastic thereto as said plastic melt is extracted from said column of plastic.

References Cited in the file of this patent

UNITED STATES PATENTS

| | | |
|---|---|---|
| 2,349,176 | Kopitke | May 16, 1944 |
| 2,372,833 | Jobst | Apr. 3, 1945 |
| 2,573,440 | Henning | Oct. 30, 1951 |
| 2,750,626 | Henning | June 19, 1956 |
| 2,783,499 | Billen | Mar. 5, 1957 |

FOREIGN PATENTS

| | | |
|---|---|---|
| 629,228 | Great Britain | Sept. 15, 1949 |

OTHER REFERENCES

Bernhardt et al.: Polyliner Improves Injection Molding, Modern Plastics, vol. 33, No. 6, pp. 109–114, published by Breskin Publications Inc., Bristol, Conn. (Copy in Scientific Library.)